United States Patent
Dockser

(10) Patent No.: US 7,725,519 B2
(45) Date of Patent: May 25, 2010

(54) FLOATING-POINT PROCESSOR WITH SELECTABLE SUBPRECISION

(75) Inventor: Kenneth Alan Dockser, Cary, NC (US)

(73) Assignee: QUALCOM Incorporated, San Diego, CA (US)

( * ) Notice: Subject to any disclaimer, the term of this patent is extended or adjusted under 35 U.S.C. 154(b) by 1211 days.

(21) Appl. No.: 11/244,492

(22) Filed: Oct. 5, 2005

(65) Prior Publication Data

US 2007/0078923 A1 Apr. 5, 2007

(51) Int. Cl.
*G06F 7/483* (2006.01)

(52) U.S. Cl. .................................... 708/497

(58) Field of Classification Search ........................ None
See application file for complete search history.

(56) References Cited

U.S. PATENT DOCUMENTS

| | | | |
|---|---|---|---|
| 4,318,014 A | | 3/1982 | McAlister et al. |
| 5,764,555 A | * | 6/1998 | McPherson et al. ......... 708/497 |
| 6,253,299 B1 | * | 6/2001 | Smith et al. ................. 711/171 |
| 6,564,238 B1 | * | 5/2003 | Kim et al. .................... 708/513 |
| 2005/0024121 A1 | | 2/2005 | Marshall et al. |
| 2005/0066205 A1 | | 3/2005 | Holmer |

OTHER PUBLICATIONS

Kent E. Wires, Michael J. Schulte and James E. Stine; Combined IEEE Compliant and Truncated Floating Point Multipliers for Reduced Power Dissipation; 2001 IEEE; 497-500; 0-7695-0200-3/01.

Woo-Hyun Paik, In-Chul Hwang, Jae-Wan Kim, and Soo-Won Kim; Data Dependent Precharging Dynamic Chain Architecture for Low Power and High Speed Adders; 1997 IEEE; 173-177; 1063-0988/97.

International Search Report—PCT/US06/039063, International Search Authority—European Patent Office—Mar. 2, 2007.

Written Opinion—PCT/US06/039063, International Search Authority—European Patent Office—Mar. 2, 2007.

International Preliminary Report on Patentability—PCT/US06/039063, The International Bureau of WIPO, Geneva Switzerland—Apr. 9, 2008.

* cited by examiner

*Primary Examiner*—David H Malzahn
(74) *Attorney, Agent, or Firm*—Nicholas J. Pauley; Peter Kamarchik; Sam Talpalatsky

(57) ABSTRACT

A floating-point processor with selectable subprecision includes a register configured to store a plurality of bits in a floating-point format, a controller, and a floating-point mathematical operator. The controller is configured to select a subprecision for a floating-point operation, in response to user input. The controller is configured to determine a subset of the bits, in accordance with the selected subprecision. The floating-point operator is configured to perform the floating-point operation using only the subset of the bits. Excess bits that are not used in the floating-point operation may be forced into a low-leakage state. The output value resulting from the floating-point operation is either truncated or rounded to the selected subprecision.

31 Claims, 3 Drawing Sheets

FLOATING-POINT PROCESSOR WITH SELECTABLE SUBPRECISION

BACKGROUND

Floating-point processors are specialized computing units that perform certain mathematical operations, e.g., multiplication, division, trigonometric functions, and exponential functions, at high speed. Accordingly, powerful computing systems often incorporate floating-point processors, either as part of the main processor or as a coprocessor. A floating-point representation of a number typically includes a sign component, an exponent, and a mantissa. To find the value of a floating-point number, the mantissa is multiplied by a base (usually 2 in computers) raised to the power of the exponent. The sign is applied to the resultant value.

The precision of the floating-point processor is defined by the number of bits used to represent the mantissa. The more bits in the mantissa, the greater the precision. The precision of the floating-point processor generally depends on the particular application. For example, the ANSI/IEEE-754 standard (followed by almost all modern computers) specifies a 32-bit single format having a 1-bit sign, an 8-bit exponent, and a 24-bit mantissa. Only the 23 fraction bits of the mantissa are stored in the 32-bit encoding, an integer bit, immediately to the left of the binary point, is implied. The IEEE-754 also specifies a 64-bit double format having a 1-bit sign, an 11-bit exponent, and a 53-bit mantissa. Analogous to the single encoding, only the 52 fraction bits of the mantissa are stored in the 64-bit encoding, an integer bit, immediately to the left of the binary point, is implied. Higher precision results in a higher accuracy, but is more computationally intense resulting in increased power consumption.

The performance of floating-point arithmetic operations can entail computational inefficiency because floating-point processors are typically limited to the precision provided by either the single format, or both the single and double formats. While some applications may require these types of precision, other applications may not. For example, some graphics applications may only require a 16-bit mantissa. For these graphics applications, any accuracy beyond 16 bits of precision tends to result in unnecessary power consumption. This is of particular concern in battery operated devices where power comes at a premium, such as wireless telephones, personal digital assistants (PDA), laptops, game consoles, pagers, and cameras, just to name a few. If it is known that an application always requires a certain reduced precision, the floating-point processor can be designed and built to that reduced precision. For most general purpose processors, however, the typical situation is that for certain applications, e.g. generating 3D graphics, a reduced precision is acceptable, and for other applications, e.g. implementing Global Positioning System (GPS) functions, a greater precision is needed. Accordingly, there is a need in the art for a floating-point processor in which the reduced precision, or subprecision, of the floating-point format is selectable.

SUMMARY

In one embodiment of a floating-point processor, the floating-point processor includes a floating-point register configured to store a plurality of bits in one or more floating-point formats, a controller, and at least one floating-point operator. The controller is configured to select a subprecision of the specified precision for a floating-point operation. The controller is further configured to determine a subset of the plurality of bits, in accordance with the selected subprecision. The floating-point operator is configured to perform the floating-point operation using only the subset of the plurality of bits.

In one embodiment of a method of performing a floating-point operation, the method includes selecting a subprecision for the floating-point operation. The method includes determining a subset of a plurality of bits stored in a floating-point register, in accordance with the selected subprecision. The method includes performing the floating-point operation using only the subset of the plurality of bits.

It should be understood that other embodiments of the floating-point processor, and of the method of performing floating-point operations, will become readily apparent to those skilled in the art from the following detailed description, in which various embodiments of the floating-point processor and of the method of performing floating-point operations are shown and described by way of illustration. As will be realized, other and different embodiments of the floating-point processor and of the method of performing floating-point operations are possible, and the details used to describe these embodiments are capable of modification in many respects. Accordingly, the drawings and the detailed description are to be regarded as illustrative in nature, and not as restrictive.

DETAILED DESCRIPTION

The detailed description set forth below in connection with the appended drawings is intended to describe various embodiments of the present invention, but is not intended to represent the only embodiments in which the present invention may be practiced. The detailed description includes specific details, in order to permit a thorough understanding of the present invention. It should be appreciated by those skilled in the art, however, that the present invention may be practiced without these specific details. In some instances, well-known structures and components are shown in block diagram form, in order to more clearly illustrate the concepts of the present invention.

In at least one embodiment of a floating-point processor, the precision for one or more floating-point operations may be reduced from that of the specified format. Instructions provided to the floating-point processor to perform mathematical operations may include a programmable control field. The control field may be used to select the subprecision of the floating-point format. By selecting the subprecision of the floating-point format, to just the precise amount needed for a particular operation, greater efficiency as well as significant power savings can be achieved.

Figure 1:
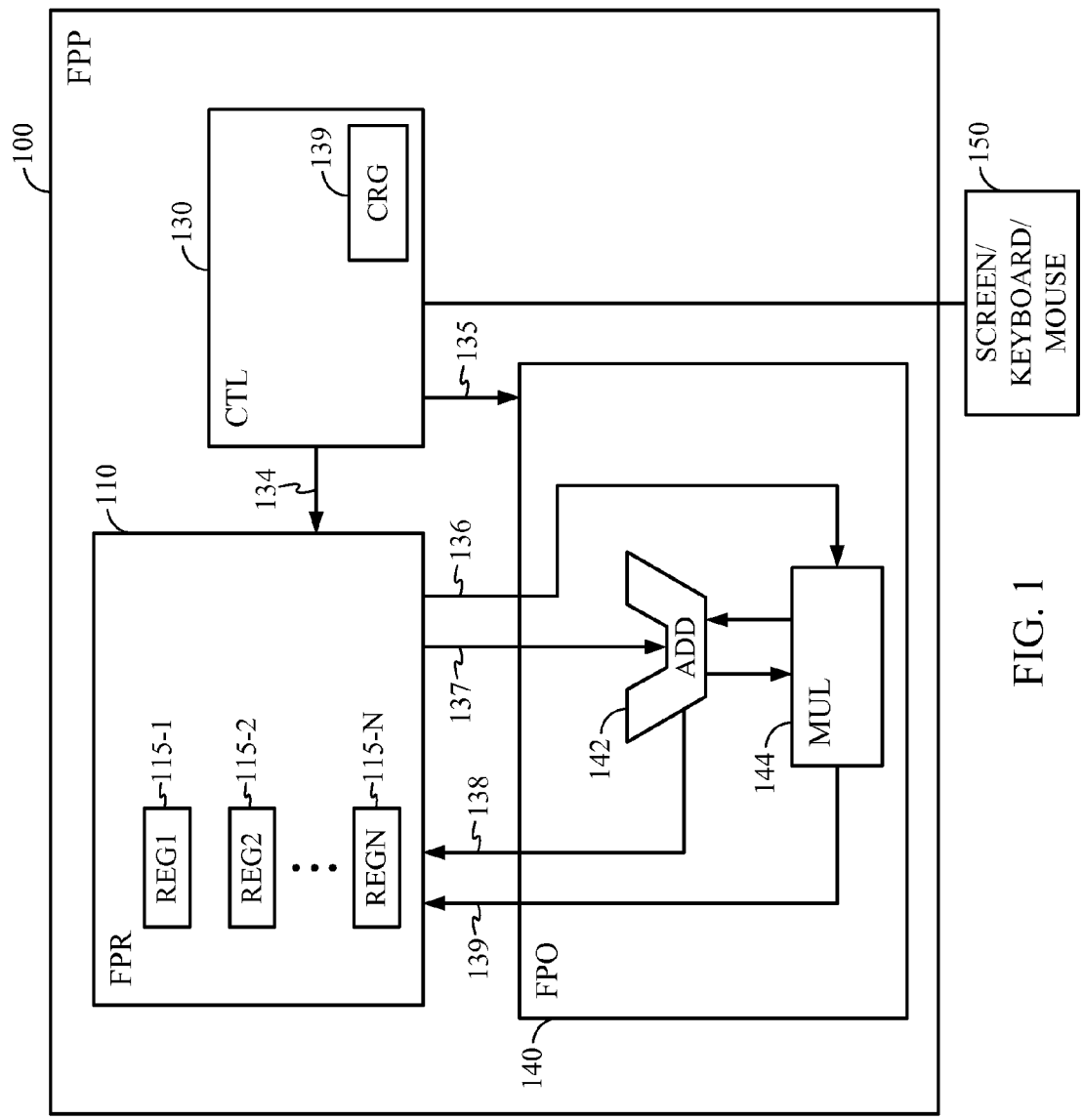
FIG. 1 is a functional block diagram illustrating an example of a floating-point processor with selectable subprecision.

FIG. 1 is a functional block diagram illustrating an example of a floating-point processor (FPP) 100 with selectable subprecision. The floating-point processor 100 includes a floating-point register file (FPR) 110; a floating-point controller (CTL) 130; and a floating-point mathematical operator (FPO) 140. The floating-point processor 100 may be implemented as part of the main processor, a coprocessor, or a separate entity connected to the main processor through a bus or other channel.

The floating-point register file 110 may be any suitable storage medium. In the embodiment shown in FIG. 1, the floating-point register file 110 includes several addressable register locations 115-1 (REG1), 115-2 (REG2), . . . 115-N (REGN), each configured to store an operand for a floating-point operation. The operands may include data from main memory and/or the results of previous floating-point operations. Instructions provided to the floating-point processor may be used to move the operands to and from the main memory.

Figure 2:
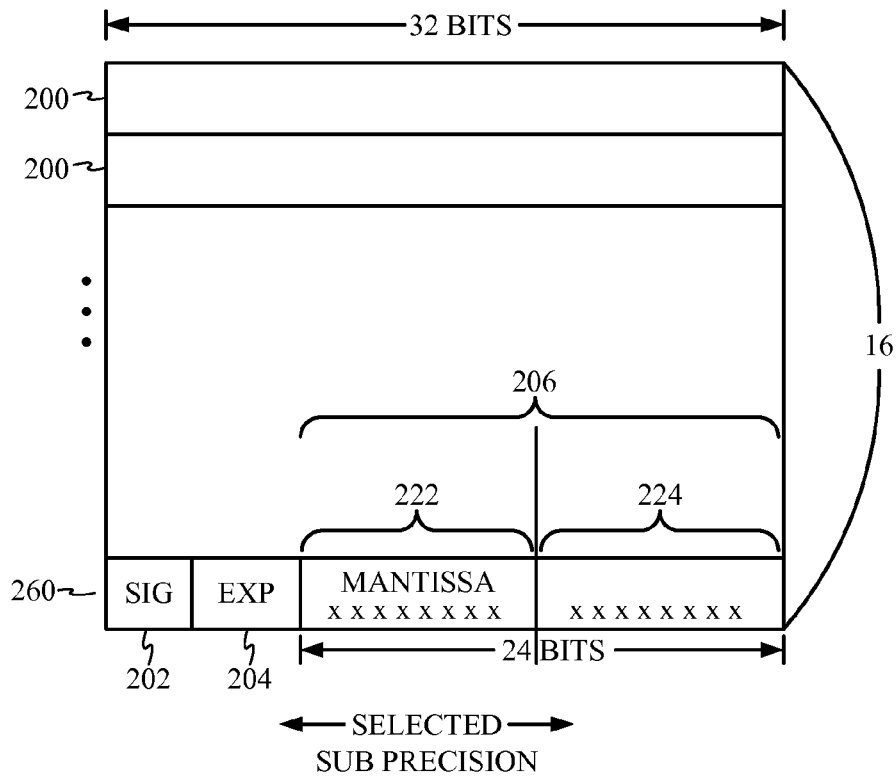
FIG. 2 schematically illustrates an example of a floating-point register file used in a floating-point processor with selectable subprecision.

FIG. 2 schematically illustrates an example of the data structure for a floating-point register file 110 used in a floating-point processor 100 with selectable subprecision, as described in conjunction with FIG. 1. In the embodiment illustrated in FIG. 2, the floating-point register file 110 includes sixteen addressable register locations, each register location being referred to with reference numeral 200 in FIG. 2 for convenience. Each register location 200 is configured to store a 32-bit binary floating-point number, in an IEEE-754 32-bit single format. In particular, each register location 200 contains a 1-bit sign 202, an 8-bit exponent 204, and a 23-bit fraction 206. It should of course be understood, however, that other embodiments of the floating-point processor 100 may include a floating-point register file 210 that is formatted differently from IEEE 32-bit single format (including but not limited to IEEE 64-bit double format), and/or contains a different number of register locations.

Referring back to FIG. 1, the floating-point controller 130 may be used to select the subprecision of the floating-point operations. A control register 137 may be loaded with subprecision select bits transmitted in the control field of one or more instructions. In a manner to be described in greater detail later, the subprecision select bits may be used by the floating-point controller 130 to reduce the precision of the operands and direct the operation of the various components within the floating-point processor 100.

The floating-point operator 140 may include one or more components configured to perform the floating-point operations. These components may include, but are not limited to, computational units such as a floating-point adder (ADD) 142 configured to execute floating-point add and subtract instructions, and a floating-point multiplier (MUL) 144 configured to execute floating-point multiply instructions. As seen in FIG. 1, each of the computational units ADD 142 and MUL 144 in the floating-point operator 140 is coupled to each other and to the floating-point register file 110 in a way as to allow operands to be transferred between the computational units, as well as between each computational unit and the floating-point register file 110. In at least one embodiment of the floating-point processor 100, the output of any one of the computational units (ADD 142 and MUL 144) may be the input of any other computational unit. The floating-point register file 110 may be used for storing intermediate results, as well as the results that are output from the floating-point operator 140.

The adder 142 may be a conventional floating-point adder, configured to perform standard arithmetic operations in a floating-point format. The multiplier 144 may be a conventional floating-point multiplier, configured to perform floating-point multiplication. The multiplier 144 may implement with, by way of example, a Booth or modified Booth algorithm, and may include partial product generation logic that generates partial products, and a number of carry-save adders that add up the partial products.

While for simplicity only an adder 142 and a multiplier 144 are shown in FIG. 1, the floating-point operator 140 may also include other computation units (not shown), which are known in the art, and which are configured to execute other types of floating-point mathematical operations. These computational units may include, but are not limited to: a floating-point divider configured to perform floating-point divide instructions; a floating-point square-root extractor configured to perform floating-point square-root extract instructions; a floating-point exponential operator configured to execute floating-point exponential instructions; a floating-point logarithmic operator configured to perform instructions for calculating logarithmic functions; and a floating-point trigonometric operator configured to perform instructions for calculating trigonometric functions.

Different embodiments of the floating-point processor 100 may include only one, or some, or all of the computational units listed above. The floating-point operator 140 may also include other units (not shown) for performing more basic operations, such as comparison, and conversion, by way of example. Such units are well known in the art, and any suitable commercially available units may be used. For example, the adder 142 and the multiplier 144 may each include one or more well-known conventional subunits such as aligners that align input operands, normalizers that shift the result into standard format, and rounders that round the result based on a specified rounding mode. Well-known circuit elements such as bit-inverters, multiplexers, counters, and combinatorial logic circuits are also included in the adder 142 and the multiplier 144.

As illustrated in FIG. 1, the floating-point operator 140 is connected to the floating-point register file 110 so that for each instruction of a requested floating-point operation, the relevant computational unit, i.e. the adder 142 or the multiplier 144, can receive from the floating-point register file 110 one or more operands stored in one or more of the register locations REG1, . . . , REGN. A conventional floating-point format converter (not shown), which selects and receives operands from the register file 110, and converts the received operands into an internal data format recognized by the computational units, may be coupled to the floating-point register file 100 and to each computational unit (ADD 142 or MUL 144).

Upon receiving the operands from the floating-point register file 110, one or more computational units in the floating-point operator 140 may execute the instructions of the requested floating-point operation on the received operands, at the subprecision selected by the floating-point controller 130. The output may be sent back to the floating-point register 110 for storage, as shown in FIG. 1

In at least one embodiment of the floating-point processor 100, a software selectable mode may be used to reduce the precision of the floating-point operations. As explained above, the instructions provided to the floating-point processor 100 may include a programmable control field to transmit subprecision select bits. The subprecision select bits are written to the control register 137, which in turn controls the bit length of the mantissa for each operand during the floating-point operation. Alternatively, the subprecision select bits may be written to the control register 137 directly from any suitable user interface, including but not limited to a monitor screen/keyboard/mouse combination 150 shown in FIG. 1. In another embodiment of the floating-point processor 100, the subprecision selection bits may be written to the control register 137 directly from the main processor, or its operating system. The control register 137, which is shown in the floating-point controller 130, may reside elsewhere as a stand-alone entity, integrated into another entity, or distributed across multiple entities.

The subprecision select bits may be used to reduce the precision of the floating-point operation. This may be achieved in a variety of ways. In at least one embodiment, the controller 130 may cause the floating-point operator 140 to read out of the register file 110 only the most-significant bits (MSBs) of the fraction required to meet the precision specified by the subprecision select bits. The higher precision, the more fraction bits that are required. By way of example, if each location in the register file contains a 23-bit fraction, and the subprecision required for the floating-point operation is 10-bits, only the 9 MSBs of the fraction are required; the hidden or integer bit makes the tenth. If the subprecision for one or more instructions is increased to 16-bits, then the 15 MSBs of the mantissa will be required. In the latter case, the 8 least-significant bits (LSBs) of the fraction may simply be ignored. Alternatively, the controller 130 may turn off the storage register elements corresponding to the excess bits 224.

Additional power savings may be realized when the floating-point register file 110 is implemented with dynamic read logic. Unlike static read logic, dynamic read logic enables a faster read time by pre-charging the bit lines and then discharging them based on the data in the selected memory locations. Thus, with dynamic read logic, power can be saved because the read logic corresponding to the excess mantissa bits do not need to be pre-charged. In some embodiments of the floating-point processor 100, the floating-point operator 140 reads the full fraction for each operand. The controller 130 may then cause the floating-point operator 140 to truncate the excess mantissa bits before performing the floating-point operation. In other embodiments of the floating-point processor 100, the controller 130 may prompt additional processing (not shown) in the front end of the floating-point operator 140 to round the mantissa for each operand to the required precision.

Another possible approach is for the controller 130 to prompt the floating-point operator 140 to force the excess mantissa bits for each operand into a low-leakage state. Many electronic components in general, and semiconductor devices in particular, experience leakage current. Leakage current is parasitic current, such as, e.g., current flowing across the gate oxide region of a metal oxide semiconductor (MOS) transistor. As the size of transistors continue to shrink, and the number of transistors integrated into a chip increase, leakage current becomes of greater concern. Depending on the particular configuration of a logic gate, which is comprised of a plurality of transistors, it will tend to have more leakage current in one state than the other. Since the particular logic-gate configuration of the floating-point operator 140 is known, the floating-point operator 140 may be used to force the excess mantissa bits into a low-leakage state, i.e., the state that results in the least leakage current. As will be explained in greater detail later for this configuration, the floating-point operator 140 is configured to prevent the excess mantissa bits forced into the low-leakage state from affecting the result of the floating-point operation.

Figure 3A:
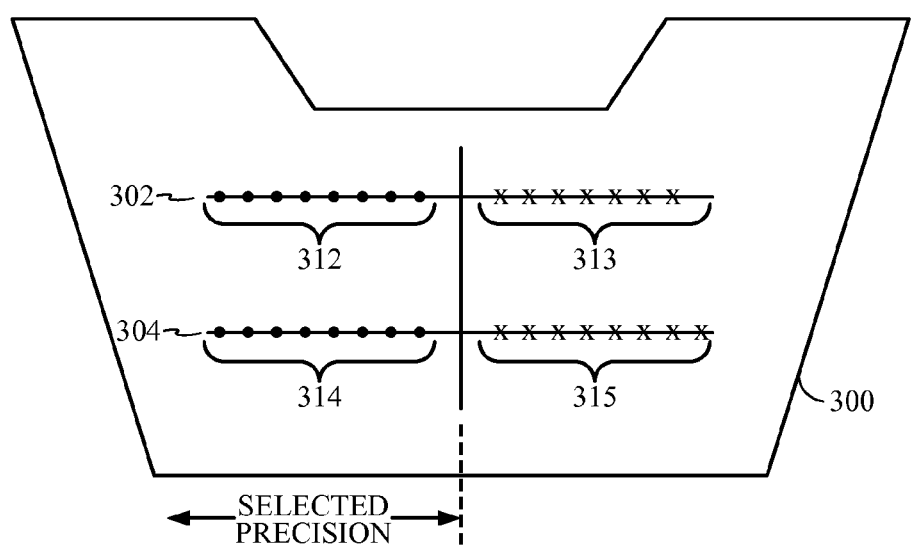
FIG. 3A is a conceptual diagram illustrating an example of a floating-point addition performed using a floating-point processor with selectable subprecision.

FIG. 3A is a conceptual diagram illustrating floating-point addition, performed using a floating-point processor that has a selectable subprecision, as described above. For simplicity, the addition of two floating-point numbers 302 and 304 in an adder 300 is illustrated. Also, for simplicity, it is assumed that the two floating-point numbers 302 and 304 have already been aligned, so that no shifting need be done. The floating-point numbers 302 and 304 are shown with the selected bits, i.e., the MSBs of the mantissa, for the addition operation, and a number of excess bits, i.e., the LSBs of the mantissa, that will not be used in the addition operation. The selected bits are illustrated using dots, and are indicated with reference numeral 312 for floating-point number 302, and with reference numeral 314 for floating-point number 304. The excess bits that are not used in the addition are illustrated using crosses, and are indicated with reference numeral 313 for floating-point number 302, and with reference numeral 315 for floating-point number 304.

In the situation where the excess bits are forced to zero (0), the floating-point addition operation can be performed without affecting the result. However, where the excess bits are forced into a low-leakage state for the adder, certain steps should be taken to prevent the excess bits from affecting the result. By way of example, if the low leakage state is one (1), the addition of the excess bits may produce a carry-out to selected bits. In at least one embodiment, the floating-point operator may be configured to block any carry-out resulting from the addition of the excess bits, or ignore such carry out, when adding the selected bits. Alternatively, a sufficient number of the most significant excess bits may be set to zero (0) to ensure that the addition of the excess bits does not result in a carry-out.

Referring back to FIG. 1, the floating-point addition operation may produce a result that has maximum precision. The controller 130 may be used to prompt the floating-point operator 140 to reduce the precision of the result to the appropriate level before writing the result back into the register file 110. This may be accomplished by rounding the result to the precision required by the subprecision select bits in the control register 137. Alternatively, the excess mantissa bits resulting from the floating-point addition operation may be truncated. If the excess mantissa bits in the operands input to the floating-point operator 140 were set to zero (0), then the floating-point addition operation will also produce a result with zeros in the excess mantissa bits. However, if the excess fraction bits in the operands were not truncated or set to a low leakage state, the excess fraction bits resulting from the floating-point addition operation may not be all zeros (0). In that case, the controller 130 may prompt the floating-point operator 140 to perform certain processing (not shown) to set all the excess fraction bits to zero (0) before writing the result back into the register file 110. In at least one embodiment of the floating-point operator, the result may be written back to the register file with the excess fraction bits being set to a low-leakage state. Also, in at least one embodiment, the excess fraction bits could be blocked from updating the register file, thereby saving power in the register file.

Figure 3B:
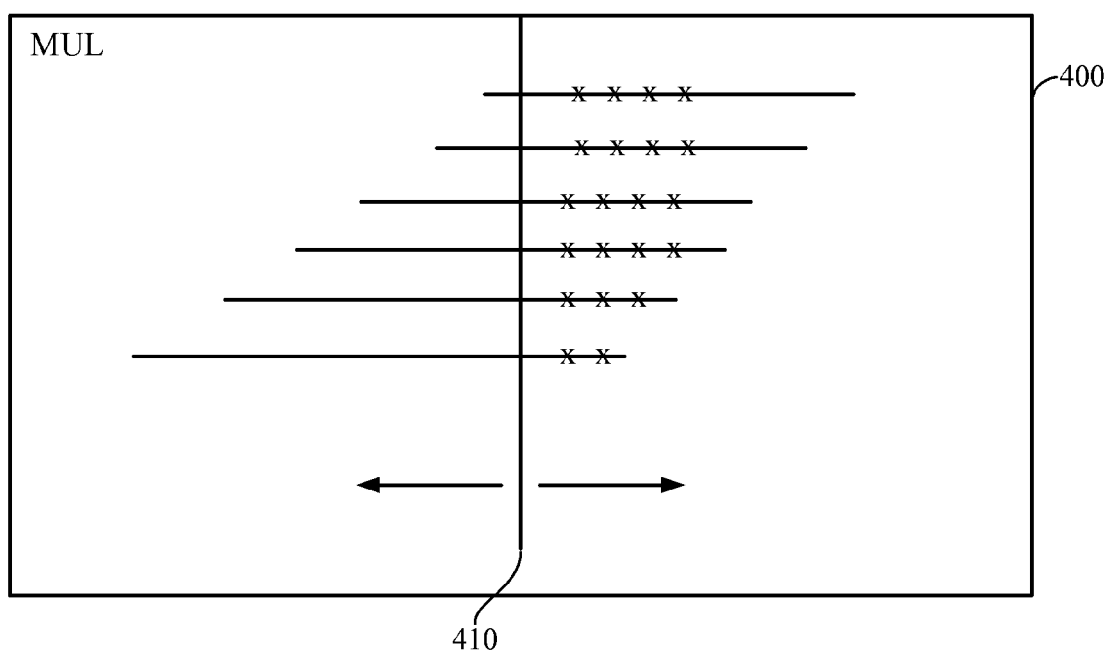
FIG. 3B is a conceptual diagram illustrating an example of a floating-point multiplication that is performed using a floating-point processor with selectable subprecision.

FIG. 3B is a conceptual diagram illustrating floating-point multiplication in a multiplier (MUL) 400, performed using a floating-point processor 100 having a selectable subprecision, as described above. As is well known, binary number multiplication is basically a series of additions of shifted values. If the subprecision selected by the user provides for N mantissa bits, the multiplier raw output value, resulting from the multiplication of two floating numbers (each having N mantissa bits), can have up to 2N output mantissa bits. In the case of 2N resulting mantissa bits from the multiplier, N excess bits may be eliminated before the result is written back to the register file. The controller can perform this function in a variety of ways. By way of example, the controller may prompt the floating-point operator to truncate the result to the desired precision. Alternatively, the controller can prompt the floating-point operator to round the result to the desired N-bit precision. In any event, the N−1 fraction bits can be written to the register file with or without zeros in the excess fraction bit positions. In at least one embodiment of the floating-point operator, the result may be written back to the register file with the excess fraction bits being set to a low-leakage state.

The various illustrative logical units, blocks, modules, circuits, elements, and/or components described in connection with the embodiments disclosed herein may be implemented or performed in a floating-point processor that is part of a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. The processor may also be implemented as a combination of computing components, e.g., a combination of a DSP and a microprocessor, a plurality of microprocessors, one or more microprocessors in conjunction with a DSP core, or any other such configuration.

The methods or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein, but is to be accorded the full scope consistent with the claims, wherein reference to an element in the singular is not intended to mean "one and only one" unless specifically so stated, but rather "one or more." All structural and functional equivalents to the elements of the various embodiments described throughout this disclosure that are known or later come to be known to those of ordinary skill in the art are expressly incorporated herein by reference, and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method of performing a floating-point operation in a floating-point computation unit, the method comprising:
    selecting a format for a floating-point operation;
    selecting a subprecision for the floating-point operation;
    determining a subset of a plurality of bits stored in a floating-point register, in accordance with the selected subprecision and wherein the floating-point register comprises an exponent section configured to store exponent bits and a fraction section configured to store fraction bits, and wherein the fraction bits comprise one or more excess bits; and
    performing the floating-point operation in the floating-point computation unit using a modified version of the subset of the plurality of bits wherein the subset is incremented based on the one or more excess bits and a rounding mode.

2. The method of claim 1, wherein the format comprises at least one of:
    a single format including one sign bit, eight exponent bits, and twenty-three fraction bits;
    a double format including one sign bit, eleven exponent bits, and fifty-two fraction bits; and
    an extended format including one sign bit, fifteen exponent bits, and sixty-four mantissa bits.

3. The method of claim 1, wherein the floating-point operation comprises at least one of: floating-point addition; floating-point subtraction; floating-point multiplication; floating-point division; floating-point square-root extraction; floating-point trigonometric function computation; floating-point exponential function computation; and floating-point logarithmic function computation.

4. The method of claim 1, wherein determining the subset of the plurality of bits comprises excluding the one or more excess bits from the subset.

5. The method of claim 4, further comprising modifying a value of the one or more excess bits to force logic gates for the one or more excess bits into a low-leakage state.

6. The method of claim 4, wherein performing the floating-point operation comprises:
    reading from the floating-point register all of the plurality of bits;
    truncating, from the bits that have been read, all of the one or more excess bits, thereby generating a truncated input number characterized by the selected subprecision; and
    performing the floating-point operation on the truncated input number to generate an output number having a plurality of output bits.

7. The method of claim 4, further comprising truncating from an output number any output bits that are in excess of the selected subprecision.

8. The method of claim 4, further comprising rounding an output number to the selected subprecision.

9. The method of claim 4, wherein performing the floating-point operation comprises forcing all the one or more excess bits to zero.

10. The method of claim 4, wherein the floating-point register comprises a plurality of register elements, each register element corresponding to a respective one of the plurality of bits; and wherein performing the floating-point operation comprises turning off one or more of the register elements corresponding to the one or more excess bits.

11. The method of claim 4, wherein performing the floating-point operation comprises blocking carry-out from any of the one or more excess bits to any one of the bits within the subset.

12. The method of claim 4, wherein performing the floating-point operation comprises:
    reading from the floating-point register the bits included within the subset, and not reading the one or more excess bits, to generate an input number characterized by the selected subprecision; and
    performing the floating-point operation on the input number, to generate an output number having a plurality of output bits.

13. The method of claim 12, further comprising truncating from the output number any of the output bits that are in excess of the selected subprecision, thereby generating a truncated output number characterized by the selected subprecision.

14. The method of claim 12, further comprising rounding the output number to the selected subprecision.

15. The method of claim 12, wherein reading the bits within the subset comprises pre-charging all bit lines of the bits within the subset, and leaving one or more bit lines of the one or more excess bits in a discharged state.

16. A floating-point processor, comprising:
a register configured to store a plurality of bits in a floating-point format;
a controller configured to select a subprecision for a floating-point operation, and further configured to determine a subset of the plurality of bits in accordance with the selected subprecision and to determine one or more excess bits; and
a floating-point computation unit configured to perform the floating-point operation using the subset of the plurality of bits, wherein the subset is incremented based on the one or more excess bits and a rounding mode.

17. The floating-point processor of claim 16, wherein the controller is further configured to select the subprecision in response to user input.

18. The floating-point processor of claim 16, wherein the floating-point computation unit comprises at least one of:
a floating-point adder configured to perform floating-point addition and subtraction;
a floating-point multiplier configured to perform floating-point multiplication;
a floating-point divider configured to perform floating-point division;
a floating-point square-root extractor configured to perform floating-point square root extraction;
a floating-point exponential operator configured to compute a floating-point exponential function;
a floating-point logarithmic operator configured to compute a floating-point logarithmic function; and
a floating-point trigonometric operator configured to compute a floating-point trigonometric function.

19. The floating-point processor of claim 16, wherein the controller is further configured to determine the subset by excluding from the subset the one or more excess bits.

20. The floating-point processor of claim 19, wherein the register comprises an exponent section configured to store exponent bits and a fraction section configured to store fraction bits; and wherein the fraction bits comprise the one or more excess bits.

21. The floating-point processor of claim 19, wherein the controller is further configured to modify a value of the one or more excess bits to force logic gates for the one or more excess bits into a low-leakage state.

22. The floating-point processor of claim 19,
wherein the floating-point computation unit is further configured to read from the register all of the plurality of bits stored in the register;
wherein the floating-point computation unit is further configured to truncate, from the bits that have been read, all of the one or more excess bits, thereby generating a truncated input number characterized by the selected subprecision; and
wherein the floating-point computation unit is further configured to perform the floating-point operation on the truncated input number to generate an output number having a plurality of output bits.

23. The floating-point processor of claim 19, wherein the floating-point computation unit is further configured to truncate from an output number any output bits that are in excess of the selected subprecision.

24. The floating-point processor of claim 19, wherein the floating-point computation unit is further configured to round an output number to the selected subprecision.

25. The floating-point processor of claim 19, wherein the controller is further configured to force all of the one or more excess bits to zero.

26. The floating-point processor of claim 19, wherein the register comprises a plurality of register elements, each register element corresponding to a respective one of the plurality of bits; and wherein the controller is further configured to turn off one or more of the register elements corresponding to the one or more excess bits.

27. The floating-point processor of claim 19, wherein the controller is configured to block off any of the one or more excess bits from carrying over to one of the bits within the subset.

28. The floating-point processor of claim 19,
wherein the floating-point computation unit is further configured to read from the register the bits within the subset, and not to read the one or more excess bits, so as to accept as input one or more floating-point numbers characterized by the selected subprecision; and
wherein the floating-point computation unit is further configured to perform the floating-point operation on the one or more input floating-point numbers so as to generate an output number having a plurality of output bits.

29. The floating-point processor of claim 28, wherein the floating-point computation unit is further configured to truncate from the output number any of the output bits that are in excess of the selected subprecision, thereby generating a truncated output number characterized by the selected subprecision.

30. The floating-point processor of claim 28, wherein the floating-point computation unit is further configured to round the output number to the selected subprecision.

31. The floating-point processor of claim 28, wherein the floating-point computation unit is further configured to pre-charge all bit lines of the bits within the subset, and to leave one or more bit lines of the one or more excess bits in a discharged state.

* * * * *

UNITED STATES PATENT AND TRADEMARK OFFICE
CERTIFICATE OF CORRECTION

| | |
|---|---|
| PATENT NO. | : 7,725,519 B2 |
| APPLICATION NO. | : 11/244492 |
| DATED | : May 25, 2010 |
| INVENTOR(S) | : Dockser |

Page 1 of 1

It is certified that error appears in the above-identified patent and that said Letters Patent is hereby corrected as shown below:

Title page, item [73] line 6, Assignee: "QUALCOM" to read as --QUALCOMM--

Signed and Sealed this
Fifth Day of July, 2011

David J. Kappos
*Director of the United States Patent and Trademark Office*